US008279585B2

(12) United States Patent
Dreissig et al.

(10) Patent No.: US 8,279,585 B2
(45) Date of Patent: Oct. 2, 2012

(54) CATHODE FOR USE IN A WET CAPACITOR

(75) Inventors: Dirk Dreissig, Myrtle Beach, SC (US); Bharat Rawal, Surfside Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 663 days.

(21) Appl. No.: 12/330,943

(22) Filed: Dec. 9, 2008

(65) Prior Publication Data

US 2010/0142124 A1 Jun. 10, 2010

(51) Int. Cl.
*H01G 9/145* (2006.01)
(52) U.S. Cl. ........ 361/532; 361/503; 361/509; 361/512; 205/200; 205/644; 429/523
(58) Field of Classification Search .................. None
See application file for complete search history.

(56) References Cited

U.S. PATENT DOCUMENTS

| | | |
|---|---|---|
| 3,345,545 A | 10/1967 | Bourgault et al. |
| 3,663,387 A | 5/1972 | Harrison |
| 3,956,080 A | 5/1976 | Hradcovsky et al. |
| 4,584,067 A | 4/1986 | Hutchins et al. |
| 4,687,551 A | 8/1987 | Furneaux et al. |
| 4,992,910 A | 2/1991 | Evans |
| 5,098,485 A | 3/1992 | Evans |
| 5,369,547 A | 11/1994 | Evans |
| 5,400,211 A | 3/1995 | Evans |
| 5,435,874 A | 7/1995 | Takeuchi et al. |
| 5,449,441 A | 9/1995 | Amor et al. |
| 5,457,862 A | 10/1995 | Sakata et al. |
| 5,469,325 A | 11/1995 | Evans |
| 5,473,503 A | 12/1995 | Sakata et al. |
| 5,543,249 A | 8/1996 | Takeuchi et al. |
| 5,559,667 A | 9/1996 | Evans |
| 5,571,640 A | 11/1996 | Takeuchi et al. |
| 5,652,474 A | 7/1997 | Wilshaw et al. |
| 5,726,118 A | 3/1998 | Ivey et al. |
| 5,729,428 A | 3/1998 | Sakata et al. |
| 5,737,181 A | 4/1998 | Evans |
| 5,754,394 A | 5/1998 | Evans et al. |
| 5,776,628 A | 7/1998 | Kraft et al. |
| 5,786,980 A | 7/1998 | Evans |

(Continued)

OTHER PUBLICATIONS

Abstract of Article—*Formation of Dimpled Tantalum Surfaces from Electropolishing*, Ed-Sayed et al., J. Electrochem. Soc., vol. 154, Issue 12, pp. C728-C732 (2007).

(Continued)

*Primary Examiner* — Courtney Smith
(74) *Attorney, Agent, or Firm* — Dority & Manning, P.A.

(57) ABSTRACT

A cathode containing a metal substrate that possesses a micro-roughened surface imparted by spark anodization is provided. The surface is formed by contacting the substrate with an electrolytic solution and applying a voltage to form a dielectric sub-oxide layer. The voltage is raised to a sufficiently high level to initiate "sparking" at the surface of the substrate, which is believed to create high local surface temperatures sufficient to etch away the substrate. This results in the formation of a "micro-roughened" surface having a plurality elevated regions. These elevated regions can increase the effective surface area and thus allow for the formation of capacitors with increased cathode capacitance for a given size and/or capacitors with a reduced size for a given capacitance. The elevated regions may also exhibit excellent adhesion to additional electrochemically-active materials and provide enhanced stability in certain liquid electrolytes.

16 Claims, 4 Drawing Sheets

U.S. PATENT DOCUMENTS

| | | | |
|---|---|---|---|
| 5,812,367 | A | 9/1998 | Kudoh et al. |
| 5,858,911 | A | 1/1999 | Wellen et al. |
| 5,894,403 | A | 4/1999 | Shah et al. |
| 5,920,455 | A | 7/1999 | Shah et al. |
| 5,926,362 | A | 7/1999 | Muffoletto et al. |
| 5,949,639 | A | 9/1999 | Maeda et al. |
| 5,973,913 | A | 10/1999 | McEwen et al. |
| 5,982,609 | A | 11/1999 | Evans |
| 6,037,077 | A | 3/2000 | Nowaczyk |
| 6,094,339 | A | 7/2000 | Evans |
| 6,096,391 | A | 8/2000 | Muffoletto et al. |
| 6,110,622 | A | 8/2000 | Frysz et al. |
| 6,191,936 | B1 | 2/2001 | Webber et al. |
| 6,208,502 | B1 | 3/2001 | Hudis et al. |
| 6,219,222 | B1 | 4/2001 | Shah et al. |
| 6,224,985 | B1 | 5/2001 | Shah et al. |
| 6,245,436 | B1 | 6/2001 | Boyle et al. |
| 6,278,231 | B1 | 8/2001 | Iwasaki et al. |
| 6,322,912 | B1 | 11/2001 | Fife |
| 6,332,900 | B1 | 12/2001 | Muffoletto et al. |
| 6,334,879 | B1 | 1/2002 | Muffoletto et al. |
| 6,387,818 | B1 | 5/2002 | Lopatin |
| 6,420,066 | B1 | 7/2002 | Frustaci et al. |
| 6,455,108 | B1 | 9/2002 | Muffoletto et al. |
| 6,461,759 | B1 | 10/2002 | Miller et al. |
| 6,461,771 | B1 | 10/2002 | Frysz et al. |
| 6,468,605 | B2 | 10/2002 | Shah et al. |
| 6,560,089 | B2 | 5/2003 | Miltich et al. |
| 6,576,524 | B1 | 6/2003 | Evans et al. |
| 6,594,139 | B2 | 7/2003 | Muffoletto et al. |
| 6,594,140 | B1 | 7/2003 | Evans et al. |
| 6,599,580 | B2 | 7/2003 | Muffoletto et al. |
| 6,603,654 | B2 | 8/2003 | Rorvick et al. |
| 6,648,928 | B2 | 11/2003 | Nielsen et al. |
| 6,652,729 | B2 | 11/2003 | Melody et al. |
| 6,687,117 | B2 | 2/2004 | Liu et al. |
| 6,707,660 | B1 | 3/2004 | Evans et al. |
| 6,721,169 | B2 | 4/2004 | Melody et al. |
| 6,721,170 | B1 | 4/2004 | Evans et al. |
| 6,727,022 | B2 | 4/2004 | Gan et al. |
| 6,740,420 | B2 | 5/2004 | Muffoletto et al. |
| 6,743,547 | B2 | 6/2004 | Gan et al. |
| 6,761,728 | B2 | 7/2004 | Harguth et al. |
| 6,788,523 | B1 | 9/2004 | Hossick-Schott et al. |
| 6,790,561 | B2 | 9/2004 | Gan et al. |
| 6,795,299 | B2 | 9/2004 | Naito |
| 6,798,643 | B2 | 9/2004 | Oyama et al. |
| 6,801,424 | B1 | 10/2004 | Nielsen et al. |
| 6,802,951 | B2 | 10/2004 | Hossick-Schott |
| 6,807,048 | B1 | 10/2004 | Nielsen et al. |
| 6,819,544 | B1 | 11/2004 | Nielsen et al. |
| 6,827,879 | B2 | 12/2004 | Shinozaki et al. |
| 6,828,059 | B2 | 12/2004 | Miller et al. |
| 6,842,328 | B2 | 1/2005 | Schott et al. |
| 6,850,405 | B1 | 2/2005 | Milcham et al. |
| 6,859,353 | B2 | 2/2005 | Elliott et al. |
| 6,859,354 | B2 | 2/2005 | Viste et al. |
| 6,885,546 | B2 | 4/2005 | Naito |
| 6,888,717 | B2 | 5/2005 | Kinard et al. |
| 6,893,777 | B2 | 5/2005 | Probst |
| 6,939,774 | B2 | 9/2005 | Viste et al. |
| 6,951,576 | B1 | 10/2005 | Takeuchi |
| 6,963,482 | B2 | 11/2005 | Breyen et al. |
| 6,965,510 | B1 | 11/2005 | Liu et al. |
| 6,967,829 | B2 | 11/2005 | Seitz et al. |
| 6,986,838 | B2 | 1/2006 | Babic et al. |
| 7,000,297 | B2 | 2/2006 | Frustaci et al. |
| 7,002,790 | B2 | 2/2006 | Hossick-Schott et al. |
| 7,012,799 | B2 | 3/2006 | Muffoletto et al. |
| 7,038,901 | B2 | 5/2006 | Muffoletto et al. |
| 7,072,171 | B1 | 7/2006 | Muffoletto et al. |
| 7,079,377 | B2 | 7/2006 | Mukai |
| 7,081,141 | B2 | 7/2006 | Schott et al. |
| 7,085,126 | B2 | 8/2006 | Hossick-Schott et al. |
| 7,092,242 | B1 | 8/2006 | Muffoletto et al. |
| 7,099,143 | B1 | 8/2006 | Gloss et al. |
| 7,110,240 | B2 | 9/2006 | Fife et al. |
| 7,116,547 | B2 | 10/2006 | Breyen et al. |
| 7,116,548 | B2 | 10/2006 | Seitz et al. |
| 7,131,988 | B2 | 11/2006 | Satterfield, Jr. et al. |
| 7,168,142 | B2 | 1/2007 | Harguth et al. |
| 7,169,284 | B1 | 1/2007 | Nowaczyk |
| 7,171,267 | B2 | 1/2007 | Jiang et al. |
| 7,177,140 | B2 | 2/2007 | Harguth et al. |
| 7,224,576 | B2 | 5/2007 | Clarke et al. |
| 7,242,572 | B2 | 7/2007 | Hossick-Schott |
| 7,244,279 | B2 | 7/2007 | Norton et al. |
| 7,256,982 | B2 | 8/2007 | Seitz et al. |
| 7,271,994 | B2 | 9/2007 | Lessner et al. |
| 7,289,314 | B2 | 10/2007 | Stemen et al. |
| 7,314,685 | B2 | 1/2008 | Kobayashi et al. |
| 7,342,774 | B2 | 3/2008 | Brown et al. |
| 7,402,183 | B1 | 7/2008 | Hossick-Schott et al. |
| 7,456,073 | B2 | 11/2008 | Jiang |
| 7,460,356 | B2 | 12/2008 | Fife et al. |
| 7,483,260 | B2 | 1/2009 | Ning |
| 7,499,260 | B2 | 3/2009 | Ziarniak et al. |
| 7,667,954 | B2 | 2/2010 | Schott et al. |
| 7,687,102 | B2 | 3/2010 | Lessner et al. |
| 7,697,187 | B2 * | 4/2010 | Hossick-Schott et al. |
| 7,736,802 | B1 | 6/2010 | Kato et al. ............ 359/253 |
| 7,785,741 | B2 | 8/2010 | Smyth |
| 2002/0092777 | A1 * | 7/2002 | Viavattine |
| 2003/0047505 | A1 | 3/2003 | Yoshimura et al. ............ 205/644 |
| 2004/0137299 | A1 * | 7/2004 | Grimes et al. |
| 2004/0225327 | A1 | 11/2004 | Mazza et al. ............ 429/34 |
| 2004/0240152 | A1 | 12/2004 | Norton et al. |
| 2004/0243183 | A1 | 12/2004 | Schott et al. |
| 2005/0002147 | A1 | 1/2005 | Norton et al. |
| 2005/0089711 | A1 | 4/2005 | Nielsen et al. |
| 2005/0098242 | A1 | 5/2005 | Hossick-Schott |
| 2005/0177193 | A1 | 8/2005 | Hossick-Schott et al. |
| 2005/0211566 | A1 * | 9/2005 | Nielsen et al. |
| 2006/0028786 | A1 | 2/2006 | Tomita et al. ............ 205/324 |
| 2006/0091020 | A1 | 5/2006 | Norton et al. |
| 2006/0123609 | A1 | 6/2006 | Hossick-Schott et al. |
| 2006/0139850 | A1 | 6/2006 | Norton et al. |
| 2006/0187616 | A1 | 8/2006 | Rorvick et al. |
| 2006/0227496 | A1 | 10/2006 | Norton et al. |
| 2007/0211412 | A1 | 9/2007 | Schott et al. |
| 2007/0211413 | A1 | 9/2007 | Fife et al. |
| 2007/0235342 | A1 | 10/2007 | Fife et al. |
| 2007/0274025 | A1 | 11/2007 | Matsuo et al. |
| 2008/0068779 | A1 | 3/2008 | Lessner et al. |
| 2008/0100905 | A1 * | 5/2008 | Restorff et al. |
| 2008/0119897 | A1 | 5/2008 | Kato et al. ............ 359/295 |
| 2008/0151474 | A1 | 6/2008 | Norton et al. |
| 2008/0229565 | A1 | 9/2008 | Ziarniak et al. |
| 2008/0232030 | A1 | 9/2008 | Schott et al. |
| 2008/0232031 | A1 | 9/2008 | Jones et al. |
| 2008/0232032 | A1 | 9/2008 | Ning |
| 2009/0117457 | A1 | 5/2009 | Jones et al. |
| 2010/0067174 | A1 * | 3/2010 | Davis et al. |
| 2010/0326967 | A1 | 12/2010 | Ning et al. ............ 361/516 |
| | | | Freitag et al. |

OTHER PUBLICATIONS

Abstract of Article—*Self-Assembled Porous Tantalum Oxide Prepared in $H_2SO_4$/HF Electrolyte*, Sieber et al., Electrochemical and Solid-State Letters, vol. 8, Issue 3, pp. J-10-J-12 (2005).

Article—*Microstructural Evaluations of Oxide Films during Spark Anodizing of Mg-Al Alloys in Alkaline Fluoride Electrolytes*, Wang et al., 212th Electrochemical Society Meeting, 1 page, Oct. 2007.

Seminar—9th Int'l Seminar on Double Layer Capacitors and Similar Energy Storage Devices (1999), Evans, et al., *Improved Capacitor Using Amorphous $RuO_2$*, Evans Capacitor Company, Deerfield Beach, FL.

Related U.S. Patent Application Form.

* cited by examiner

CATHODE FOR USE IN A WET CAPACITOR

BACKGROUND OF THE INVENTION

Wet capacitors are increasingly being used in the design of circuits due to their volumetric efficiency, reliability, and process compatibility. Wet capacitors typically have a larger capacitance per unit volume than certain other types of capacitors, making them valuable in high-current, high power and low-frequency electrical circuits. One type of wet capacitor that has been developed is a wet electrolytic capacitor that includes a valve metal anode, a cathode, and a liquid electrolyte. The unit cell voltage in this type of capacitor is generally higher due to the formation of a dielectric metal oxide film over the anode surface. Wet electrolytic capacitors tend to offer a good combination of high capacitance with low leakage current. Another type of wet capacitor is a wet symmetric capacitor in which the anode and cathode are similar in terms of structure and composition. The unit cell voltage in this type of capacitor is generally low due to the inevitable decomposition of the electrolyte at high voltage. Whether electrolytic or symmetric, however, the cathodes of wet capacitors typically include a substrate and a coating that provides high capacitance through a faradic or non-faradic mechanism. To enhance the adhesion of such coatings, the substrate is sometimes mechanically and/or chemically etched. However, under certain conditions, such as in the in the presence of aqueous electrolytes, the coatings can still become easily detached.

As such, a need currently exists for an improved cathode for use in wet capacitors.

SUMMARY OF THE INVENTION

In accordance with one embodiment of the present invention, a wet capacitor is disclosed that comprises an anode; a cathode; and a working electrolyte disposed between the anode and cathode. The cathode comprises a spark anodized metal substrate coated with an electrochemically-active material. The substrate has a micro-roughened surface containing a plurality of elevated regions.

In accordance with another embodiment of the present invention, an electrically conductive cathode is disclosed that comprises a spark anodized tantalum foil coated with an electrochemically-active material. The foil has a micro-roughened surface containing a plurality of elevated regions, wherein at least a portion of the elevated regions have a height of from about 200 to about 2500 nanometers. In accordance with still another embodiment of the present invention, a method for forming a cathode is disclosed. The method comprises immersing a metal substrate in an anodizing solution and applying a current at a voltage of from about 90 to about 275 Volts to initiate spark anodization and form a micro-roughened surface on the substrate that has a plurality of elevated regions.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
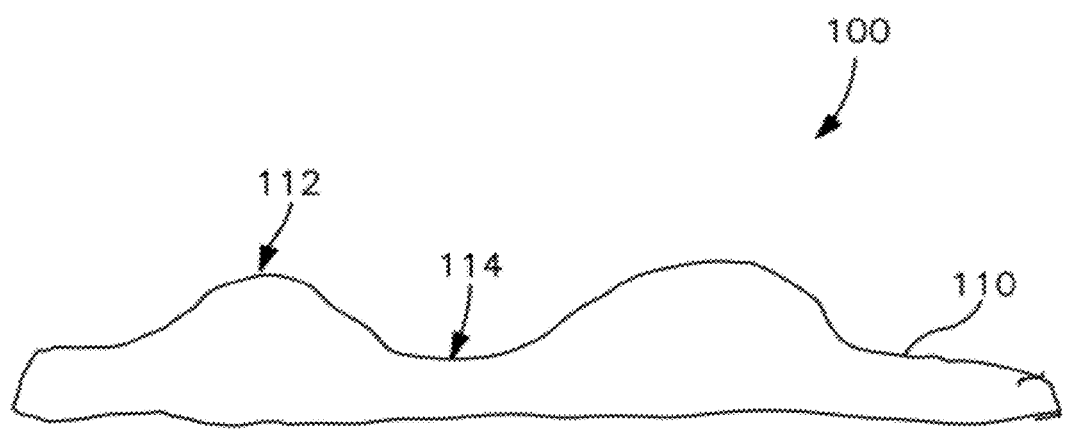
FIG. 1 is a cross-section view of one embodiment of the micro-roughened substrate of the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed a cathode containing a metal substrate that possesses a micro-roughened surface imparted by spark anodization. The surface is formed by contacting the substrate with an electrolytic solution and applying a voltage to form a dielectric sub-oxide layer. The voltage is raised to a sufficiently high level to initiate "sparking" at the surface of the substrate, which is believed to create high local surface temperatures sufficient to etch away the substrate. This results in the formation of a "micro-roughened" surface having a plurality elevated regions. These elevated regions can increase the effective surface area and thus allow for the formation of capacitors with increased cathode capacitance for a given size and/or capacitors with a reduced size for a given capacitance. The elevated regions may also exhibit excellent adhesion to additional electrochemically-active materials and provide enhanced stability in certain liquid electrolytes.

The metal substrate may include any metal, such as tantalum, niobium, aluminum, nickel, hafnium, titanium, copper, silver, steel (e.g., stainless), alloys thereof (e.g., electrically conductive oxides), and so forth. Tantalum and niobium metals, as well as alloys thereof, are particularly suitable for use in the present invention. The geometric configuration of the substrate may generally vary as is well known to those skilled in the art, such as in the form of a container, can, foil, sheet, screen, etc. The surface area of the substrate prior to spark anodization may range from about 0.05 to about 5 square centimeters, in some embodiments from about 0.1 to about 3 square centimeters, and in some embodiments, from about 0.5 to about 2 square centimeters.

Any technique may be employed to contact the substrate with the anodizing solution, such as dipping, spraying, coating, etc. Regardless, the anodizing solution generally contains one or more ionic compounds (i.e., a compound that contains one or more ions or is capable of forming one or more ions in solution) to initiate anodic oxidation. Suitable ionic compounds may include, for instance, inorganic acids, such as sulfuric acid, phosphoric acid, polyphosphoric acid, boric acid, boronic acid, etc.; inorganic salts including lithium sulfate, lithium persulfate, sodium sulfate, sodium persulfate, potassium sulfate, potassium persulfate, lithium bisulfate, sodium bisulfate, potassium bisulfate, lithium dihydrogen phosphate, dilithium hydrogen phosphate, lithium phosphate, sodium dihydrogen phosphate, disodium hydrogen phosphate sodium phosphate, potassium dihydrogen phosphate, dipotassium hydrogen phosphate, potassium phosphate, combinations thereof, and so forth.

Chemical compounds may also be employed to facilitate breakdown of the oxide film. In one embodiment, for example, a corrosive compound (e.g., acid or salt) may be employed that helps dissolving the dielectric sub-oxide film as it is formed. Examples of such corrosive compounds include, for instance, hydrofluoric acid, ammonium fluoride, buffered oxide etch (a solution of hydrofluoric acid and ammonium fluoride), lithium fluoride, sodium fluoride, potassium fluoride, etc. and any combination thereof. When employed, the weight ratio of the corrosive compound(s) to the ionic compound(s) is typically from about 0.2 to about 5.0, in some embodiments from about 0.5 to about 4.0, and in some embodiments, from about 0.8 to about 3.0. In one particular embodiment, the anodizing solution may contain sulfuric acid and phosphoric acid. Sulfuric acid, for instance, may be present in the solution in an amount of from about 20 vol. % to about 80 vol. %, in some embodiments from about 30 vol. % to about 70 vol. %, and in some embodiments, from about 40 vol. % to about 60 vol. % (e.g., 50 vol. %). Phosphoric acid may likewise be present in the solution in an amount from about 20 vol. % to about 80 vol. %, in some embodiments from about 30 vol. % to about 70 vol. %, and in some embodiments, from about 40 vol. % to about 60 vol. % (e.g., 50 vol. %).

A current (e.g., DC current) is applied to the solution at a voltage (e.g., positive voltage) that is above the dielectric breakdown voltage ("breakdown" stage) for the substrate to initiate spark anodization. This may occur, for instance, at a constant current or as a pulsed voltage. The dielectric breakdown voltage is often within a range of from about 90 Volts to about 275 Volts, in some embodiments from about 100 Volts to about 250 Volts, and in some embodiments, from about 115 Volts to about 220 Volts. The voltage level may vary (e.g., increasing) or remain constant. In one embodiment, for example, the voltage level is increased incrementally, such as by no more than about 50%, in some embodiments no more than about 25%, and in some embodiments, no more than about 10% of the existing voltage. For example, the incremental increases(s) may be not more than about 30 Volts, in some embodiments not more than about 15 Volts, and in some embodiments, not more than about 5 Volts above the existing voltage. It should be understood that instead of simply raising the voltage, known reverse pulse voltage techniques may be also used.

Other parameters may also be controlled to achieve the desired level of surface roughening of the substrate. The temperature of the anodizing solution during spark anodization may be, for example, from about 10° C. to about 70° C., in some embodiments from about 15° C. to about 60° C., and in some embodiments, from about 20° C. to about 55° C. The current density is also typically from about 0.005 to about 1 A/cm$^2$, in some embodiments from about 0.01 to about 0.7 A/cm$^2$, and in some embodiments, from about 0.02 to about 0.5 A/cm$^2$. The temperature and current density may vary or remain constant during spark anodization.

If desired, the substrate may also be subjected to a heating step to minimize the oxidation of the metal substrate. The temperature at which the substrate is heated depends on the type of components employed in the anode body. For example, the substrate is typically heated by an oven that operates at a temperature of from about 200° C. to about 1400° C., in some embodiments from about 300° C. to about 1200° C., and in some embodiments, from about 400° C. to about 1000° C. Such heating may occur for about 5 to about 300 minutes, in some embodiments from about 10 to about 200 minutes, and in some embodiments, from about 15 minutes to about 90 minutes. Heat treatment also typically occurs in a reducing atmosphere, such as in a vacuum, inert gas, hydrogen, etc. If desired, a getter material may also be employed that can bind to any oxygen atoms removed during heat treatment to further enhance conductivity, such as tantalum, niobium, carbon, magnesium, etc. or combinations thereof.

As a result of the process described above, a substrate is formed that has a micro-roughened surface with a plurality of elevated regions. Referring to FIG. 1, for instance, one embodiment of a substrate 100 is shown that contains a micro-roughened surface 110. As illustrated, the surface 110 contains a plurality of elevated regions 112 spaced between a plurality of pits 114. The elevated regions 112 generally have a size sufficient to effectively increase the surface area of the substrate. In this regard, the average height ("H") of the elevated regions 112 is typically from about 200 to about 2500 nanometers, in some embodiments from about 300 to about 2000 nanometers, and in some embodiments, from about 500 to about 1500 nanometers. The shape of the elevated regions 112 may likewise be circular, tubular, square, rectangular, cylindrical, etc. in the illustrated embodiment, for example, the elevated regions have a substantially cylindrical shape. The extent to which the elevated regions 112 are disposed over the surface of the substrate may also vary. For example, the elevated regions 112 may be present in a spaced-apart fashion over the surface so that they form "island-like" structures. In this manner, the constituents of a cathode coating may be subsequently disposed in the spaces of these adjacent particles to enhance their adherence to the substrate 100. The extent to which the elevated regions 112 are spaced apart may vary. For example, adjacent elevated regions may be spaced apart a "peak-to-peak" distance ("D") that ranges from about 20 to about 500 micrometers, in some embodiments from about 30 to about 400 micrometers, in some embodiments, from about 50 to about 200 micrometers. The number of elevated regions 112 may also be high enough to produce the desired increase in surface area. For example, the surface 110 may possess from 1 to 20, in some embodiments, from 2 to 15, and in some embodiments, from 3 to 10 elevated regions per 100 square micrometers.

Regardless of the specific configuration of the elevated regions, the resulting micro-roughened surface has an area that is greater than the area of the substrate prior to spark anodization. As indicated above, such an increased effective surface area allows for increased cathode capacitance for a given size and/or capacitors with a reduced size for a given capacitance. For instance, the ratio of the surface area of the micro-roughened substrate to that of the initial substrate may be from about 1.00 to about 5.00, in some embodiments from about 1.05 to about 3.50, and in embodiments, from about 1.10 to about 3.00.

To the extent that the spark anodization process deposits any oxide film on the surface of the substrate, it is extremely thin in nature and does not form a continuous coating over the surface. That is, the surface is defined by regions of both metal and oxide-coated metal. For this reason, the micro-roughened substrate can remain highly conductive. The extent of conductivity may be characterized in terms of the "resistivity" at about 20° C., which is generally less than about 1 ohm-cm, in some embodiments less than about $1 \times 10^{-2}$ ohm-cm, in some embodiments less than about $1 \times 10^{-3}$ ohm-cm, and in some embodiments, less than about $1 \times 10^{-4}$ ohm-cm. Although conductive, the substrate may nevertheless be coated with an additional layer of a conductive material to further improve the surface conductivity. Examples of such materials may include metals, such as gold, platinum, palladium, copper, silver, etc.

If desired, an electrochemically-active material may optionally be applied to the micro-roughened substrate to even further increase the effective surface area over which the electrolyte electrochemically communicates with the substrate. Any of a variety of known electrochemically-active materials may generally be employed. In one embodiment, for example, a conductive polymer may be employed, such as a polypyrrole; polythiophene, such as poly(3,4-ethylenedioxythiophene) (PEDT); polyaniline; polyacetylene; poly-p-phenylene; derivatives thereof; and so forth. As is known in the art, such conductive polymers may be formed from a monomer that polymerizes to assume an amorphous, non-crystalline form, which appears somewhat like a web when viewed under scanning electron microscopy. This means that the resultant conductive polymer coating has a high surface area and therefore acts to increase the effective surface area of the substrate to which it is applied.

The conductive polymer coating may contain one or multiple conductive polymer layers and be formed using a variety of known techniques. For instance, techniques such as screen-printing, dipping, electrophoretic coating, and spraying, may be used to form the coating. In one embodiment, for example, the monomer(s) used to form the conductive polymer (e.g., PEDT), may initially be mixed with a polymerization catalyst to form a dispersion. One suitable polymerization catalyst is CLEVIOS C (Bayer Corporation), which is iron (III) toluenesulphonate and n-butanol. CLEVIOS C is a commercially available catalyst for CLEVIOS M, which is 3,4-ethylenedioxythiophene, a PEDT monomer also sold by Bayer Corporation. Once a dispersion is formed, the substrate may then be dipped into the dispersion so that the conductive polymer forms. Alternatively, the catalyst and monomer(s) may also be applied separately. For example, the catalyst may be dissolved in a solvent (e.g., butanol) and then applied as a dipping solution. Although various methods have been described above, it should be understood that any other method for applying the coating comprising the conductive polymer coating may also be utilized. For example, other methods for applying such a coating comprising one or more conductive polymers may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to or in lieu of conductive polymers, metals, such as metal particles formed from ruthenium, iridium, nickel, rhodium, rhenium, cobalt, tungsten, manganese, tantalum, niobium, molybdenum, lead, titanium, platinum, palladium, and osmium, as well as combinations of these metals, may also be employed. In one particular embodiment, for example, the electrochemically-active material includes palladium particles. Non-insulating oxide particles may also be employed in the present invention. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. No. 5,726,118 to Ivey, et al.; U.S. Pat. No. 5,858,911 to Wellen, et al.; as well as U.S. Patent Application Publication No. 2003/0158342 to Shinozaki, et al., all of which are incorporated herein in their entirety by reference thereto for all purposes.

If desired, a binder may sometimes be employed to help adhere the electrochemically-active material to the substrate. Any binder that provides the requisite level of adhesive strength may be used. For example, suitable binders may include polytetrafluoroethylene, polyvinylidene fluoride, carboxymethylcellulose, fluoroolefin copolymer crosslinked polymer, polyvinyl alcohol, polyacrylic acid, polyimide, petroleum pitch, coal pitch, and phenol resins. A conductive filler may also be employed in some embodiments to further enhance the conductivity of the electrochemically-active material. Such conductive fillers may be particularly beneficial in counteracting any loss of conductivity that might result from a binder covering a portion of the surface of the electrochemically-active material. Any suitable conductive filler may be employed, such as metallic particles (e.g., silver, copper nickel, aluminum, and so forth); non-metallic particles (e.g., carbon black, graphite, and so forth).

As a result of the present invention, cathodes may be formed that have a relatively high specific capacitance. For example, the specific capacitance of the cathode may be about 10 milliFarads per square centimeter ("$mF/cm^2$") or more, in some embodiments about 15 $mF/cm^2$ or more, and in some embodiments, from about 25 to about 100 $mF/cm^2$, as determined in a 5.0 M $H_2SO_4$ solution at a frequency of 120 Hz. The high capacitance values may be achieved even at a relatively low total thickness of about 100 micrometers or less, in some embodiments about 75 micrometers or less, and in some embodiments, from about 10 to about 50 micrometers. Such thin, high capacitance electrodes are well suited for use in a wide variety of applications, including symmetrical and non-symmetrical wet capacitors, hybrid capacitors, batteries, and so forth. In one embodiment, for example, the cathode may be employed in a non-symmetrical wet electrolytic capacitor that includes an anode, cathode, and a working electrolyte disposed therebetween and in contact with the anode and the cathode. In this regard, various embodiments of such wet electrolytic capacitors that may be formed according to the present invention will now be described in more detail. It should be understood that the description below is merely exemplary, and multiple other embodiments are also contemplated by the present invention.

The anode of the wet electrolytic capacitor may generally be formed from a variety of different materials. For example, the anode may be formed from a powder constituted primarily by a valve metal (i.e., metal that is capable of oxidation) or from a composition that contains the valve metal as a component. Suitable valve metals that may be used include, but are not limited to, tantalum, niobium, aluminum, hafnium, titanium, alloys of these metals, and so forth. For example, the anode may be formed from a valve metal oxide or nitride (e.g., niobium oxide, tantalum oxide, tantalum nitride, niobium nitride, etc.) that is generally considered a semi-conductive or highly conductive material. Particularly suitable valve metal oxides for use in the anode include niobium oxides having an atomic ratio of niobium to oxygen of 1:less than 2.5, in some embodiments 1:less than 1.5, in some embodiments 1:less than 1.1, and in some embodiments, 1:1.0±0.2. For example, the niobium oxide may be $Nb_{0.7}$, $NbO_{1.0}$, $NbO_{1.1}$, and $NbO_2$. Additional examples of such valve metal oxides are described in U.S. Pat. No. 6,322,912 to Fife, which is incorporated herein in its entirety by reference thereto for all purposes. Examples of valve metal nitrides are also described in "Tantalum Nitride: A New Substrate for Solid Electrolytic Capacitors" by T. Tripp; Proceedings of CARTS 2000: 20th Capacitor and Resistor Technology Symposium, 6-20 Mar. 2000.

A variety of conventional fabricating procedures may generally be utilized to form the anode. For example, the anode may be formed as a foil, pressed powder, etc. as is well known in the art. Exemplary pressed powder anodes are described, for instance, in U.S. Pat. No. 7,099,143 to Fife et al, which is incorporated herein in its entirety by reference thereto for all purposes. Alternatively, the anode may be formed from ceramic particles (e.g., $Nb_2O_5$, $Ta_2O_5$) that are chemically reduced to form an electrically conductive material (e.g., NbO, Ta). For instance, a slip composition containing the ceramic particles may be initially formed and deposited onto a substrate in the form of a thin layer. If desired, multiple layers may be formed to achieve the target thickness for the anode. Once formed, the layer(s) may be subjected to a heat treatment to chemically reduce the ceramic particles and form the electrically conductive anode. Such slip-formed anodes may exhibit a small thickness, high aspect ratio (i.e., ratio of width to thickness), and uniform density, which may in turn lead to an improved volumetric efficiency and equivalent series resistance ("ESR"). For example, the anodes may have a thickness of about 1500 micrometers or less, in some embodiments about 1000 micrometers or less, and in some embodiments, from about 50 to about 500 micrometers. Likewise, the anodes may have an aspect ratio of about 1 or more, in some embodiments about 5 or more, and in some embodiments, about 15 or more.

The anode may possess any desired shape, such as square, rectangular, circular, ovular, triangular, cylindrical, etc. Polygonal shapes having more than four (4) edges (e.g., hexagon, octagon, heptagon, pentagon, etc.) are particularly desired due to their relatively high surface area. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Once formed, the anode may be anodized so that a dielectric film is formed over and within the anode. For example, a niobium oxide (NbO) anode may be anodized to form niobium pentoxide ($Nb_2O_5$). Specifically, in one embodiment, the niobium oxide anode is dipped into a weak acid solution (e.g., phosphoric acid, polyphosphoric acid, mixtures thereof, and so forth) at an elevated temperature (e.g., about 85° C.) that is supplied with a controlled amount of voltage and current to form a niobium pentoxide coating having a certain thickness. The power supply is initially kept at a constant current until the required formation voltage is reached. Thereafter, the power supply is kept at a constant voltage to ensure that the desired dielectric thickness is formed over the surface of the anode. The anodization voltage typically ranges from about 10 to about 200 Volts, and in some embodiments, from about 20 to about 100 Volts. In addition to being formed on the surface of the anode, a portion of the dielectric oxide film will also typically form on the surfaces of the pores of the material. It should be understood that the dielectric film may be formed from other types of materials and using different techniques.

The working electrolyte is the electrically active material that provides the connecting path between the anode and cathode, and is generally in the form of a liquid, such as a solution (e.g., aqueous or non-aqueous), dispersion, gel, etc. For example, the working electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable working electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

In one particular embodiment, the electrolyte is relatively neutral and has a pH of from about 3.0 to about 8.0, in some embodiments from about 4.0 to about 7.5, and in some embodiments, from about 5.0 to about 7.5. Despite possessing a neutral pH level, the electrolyte is nevertheless electrically conductive. For instance, the electrolyte may have an electrical conductivity of about 10 or more milliSiemens per centimeter ("mS/cm"), in some embodiments about 30 mS/cm or more, and in some embodiments, from about 40 mS/cm to about 100 mS/cm, determined at a temperature of 25° C. The value of electric conductivity may obtained by using any known electric conductivity meter (e.g., Oakton Con Series 11) at a temperature of 25° C.

The working electrolyte may include a variety of components that help optimize its conductivity, pH, and stability during storage and use of the capacitor. For instance, a solvent is generally employed that functions as a carrier for the other components of the electrolyte. The solvent may constitute from about 30 wt. % to about 90 wt. %, in some embodiments from about 40 wt. % to about 80 wt. %, and in some embodiments, from about 45 wt. % to about 70 wt. % of the electrolyte. Any of a variety of solvents, or mixed solvent systems, may be employed, such as water (e.g., deionized water); ethers (e.g., diethyl ether and tetrahydrofuran); alcohols (e.g., methanol, ethanol, ethylene glycol, n-propanol, iso-propanol, and butanol); triglycerides; ketones (e.g., acetone, methyl ethyl ketone, and methyl isobutyl ketone); carbonates (e.g. dimethyl carbonate, ethylene carbonate, propylene carbonate, butylene carbonate); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Although not necessarily required, the use of an aqueous solvent (e.g., water) is often desired to help maintain the pH of the electrolyte at a relatively neutral level. In fact, water may constitute about 50 wt. % or more, in some embodiments, about 70 wt. % or more, and in some embodiments, about 90 wt. % to 100 wt. % of the solvent(s) used in the electrolyte.

The electrical conductivity of the working electrolyte may be imparted by one or more ionic compounds, such as described above. The concentration of ionic compounds is selected to achieve the desired balance between electrical conductivity and pH. That is, a strong acid (e.g., phosphoric acid) may be employed as an ionic compound, although its concentration is typically limited to maintain the desired neutral pH level. When employed, strong acids normally constitute from about 0.001 wt. % to about 5 wt. %, in some embodiments from about 0.01 wt. % to about 2 wt. %, and in some embodiments, from about 0.1 wt. % to about 1 wt. % of the electrolyte. Weak acids (e.g., acetic acid), on the other hand, may be employed so long as the desired electrical conductivity is achieved. When employed, weak acids normally constitute from about 1 wt. % to about 40 wt. %, in some embodiments from about 2 wt. % to about 30 wt. %, and in some embodiments, from about 5 wt. % to about 25 wt. % of the electrolyte. If desired, blends of weak and strong acids may be employed in the electrolyte. The total concentration of ionic compounds may vary, but is typically from about 1 wt. % to about 50 wt. %, in some embodiments from about 2 wt. % to about 40 wt. %, and in some embodiments, from about 5 wt. % to about 30 wt. % of the electrolyte.

If desired, basic pH modifiers may also be used in the electrolyte in an amount effective to balance the effect of the ionic compounds on pH. Suitable basic pH modifiers may include, but are not limited to, ammonia; mono-, di-, and tri-alkyl amines; mono-, di-, and tri-alkanolamines; alkali metal and alkaline earth metal hydroxides; alkali metal and alkaline earth metal silicates; and mixtures thereof. Specific examples of basic pH modifiers are ammonia; sodium, potassium, and lithium hydroxide; sodium, potassium, and lithium meta silicates; monoethanolamine; triethylamine; isopropanolamine; diethanolamine; and triethanolamine.

To ensure that the electrolyte remains stable during conditions of normal storage and use, it is generally desired that its freezing point is about −20° C. or less, and in some embodiments, about −25° C. or less. If desired, one or more freezing point depressants may be employed, such as glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); and so forth. Although the concentration of the freezing point depressant may vary, it is typically present in an amount of from about 5 wt. % to about 50 wt. %, in some embodiments from about 10 wt. % to about 40 wt. %, and in some embodiments, from about 20 wt. % to about 30 wt. % of the electrolyte. It should also be noted that the boiling point of the electrolyte is typically about 85° C. or more, and in some embodiments, about 100° C. or more, so that the electrolyte remains stable at elevated temperatures.

A depolarizer may also be employed in the working electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte.

Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth. Without intending to be limited by theory, it is believed that alkyl-substituted nitrobenzoic compounds may be preferentially electrochemically adsorbed on the active sites of the cathode surface when the cathode potential reaches a low region or the cell voltage is high, and may be subsequently desorbed therefrom into the electrolyte when the cathode potential goes up or the cell voltage is low. In this manner, the compounds are "electrochemically reversible", which may provide improved inhibition of hydrogen gas production.

Figure 2:
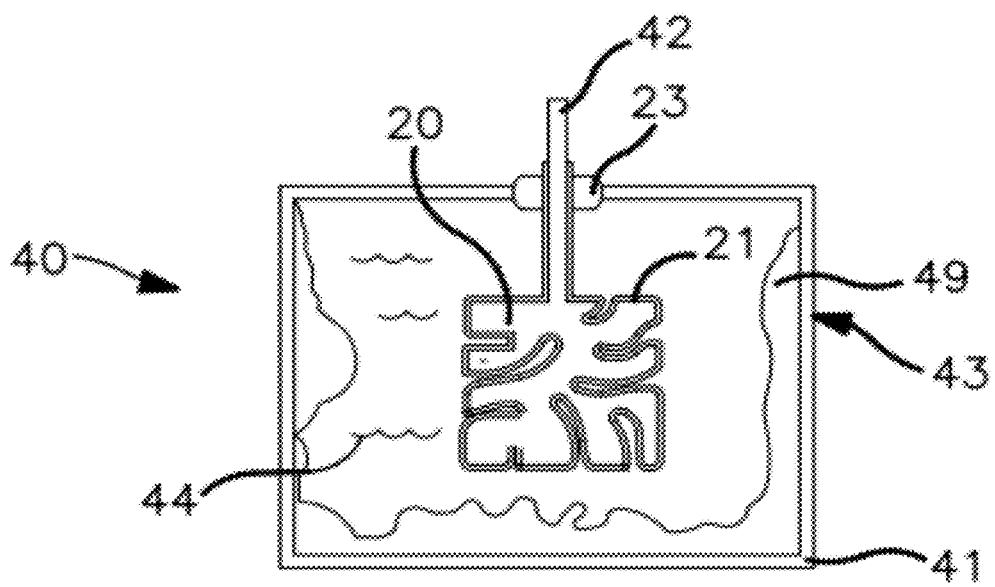
FIG. 2 is a cross-sectional view of one embodiment of a capacitor formed according to the present invention.
Figure 3:
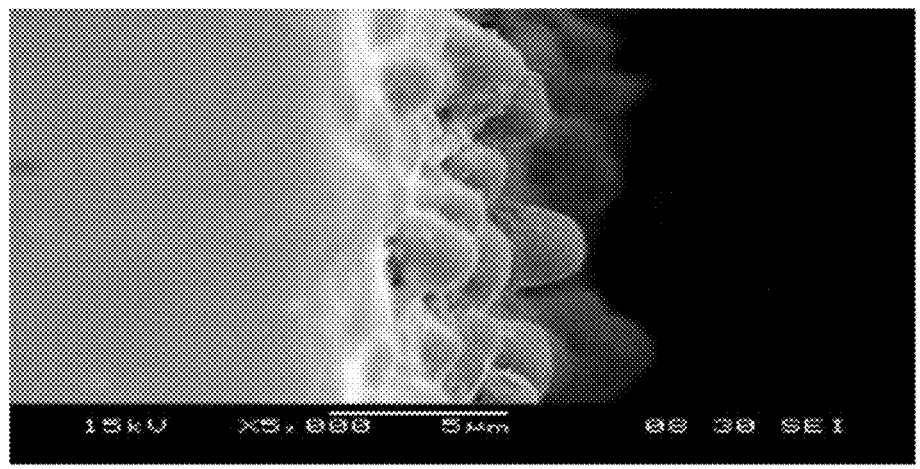
FIG. 3 is an SEM photograph (15 kV, 5,000×) of a cross-section of the tantalum electrode formed in Example 2.
Figure 4:
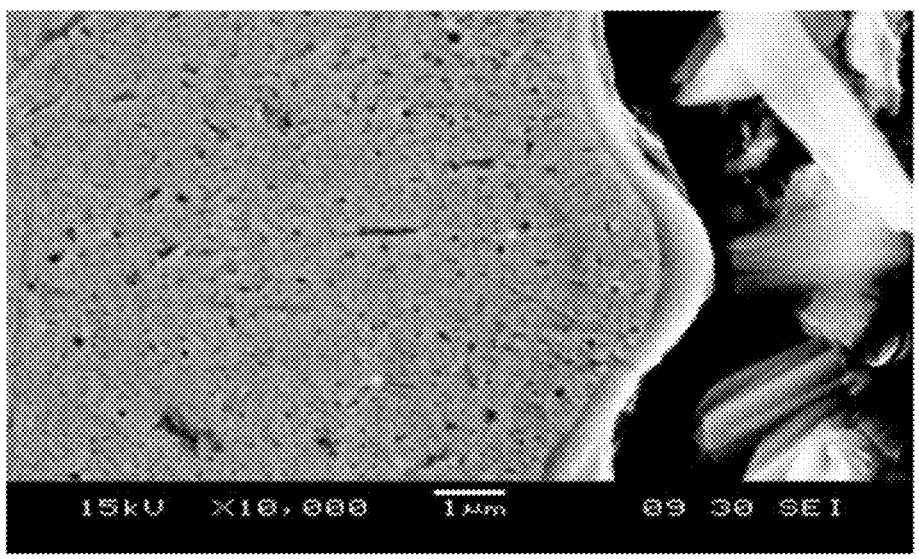
FIG. 4 is an SEM photograph (15 kV, 10,000×) of a cross-section of the tantalum electrode formed in Example 2, shown at a higher magnification than FIG. 3 to better illustrate an elevated region of the micro-roughened surface.
Figure 5:
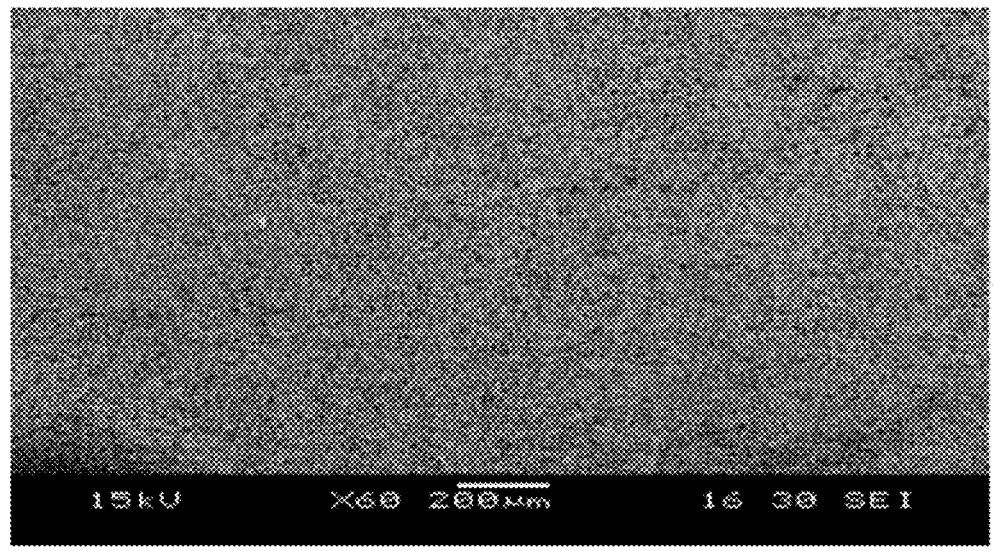
FIG. 5 is an SEM photograph (15 kV, 60×) of the top of the tantalum electrode formed in Example 2.
Figure 6:
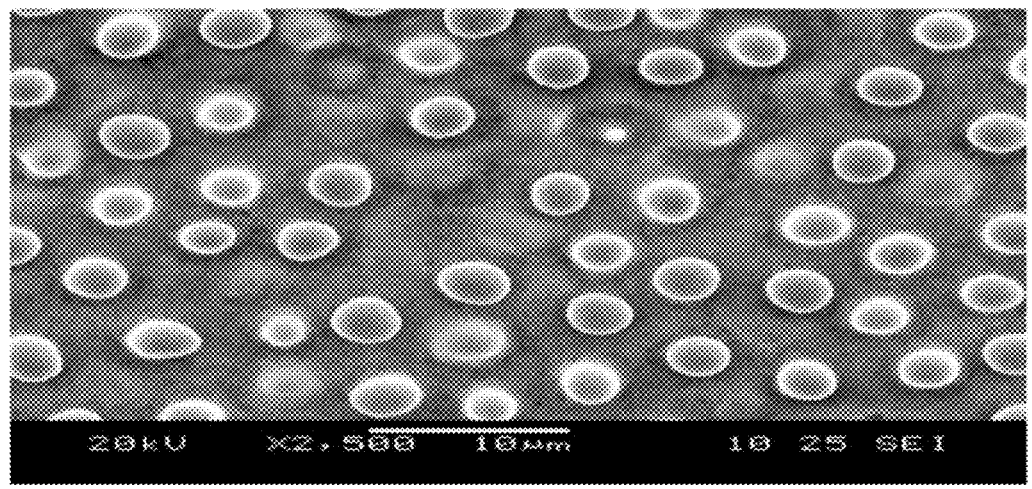
FIG. 6 is an SEM photograph (20 kV, 2,500×) of the top of the tantalum electrode formed in Example 2, shown at a higher magnification than FIG. 5 to better illustrate the micro-roughened surface.

The physical arrangement of the anode, cathode, and working electrolyte of the capacitor may generally vary as is well known in the art. Referring to FIG. 2, for example, one embodiment of a wet electrolytic capacitor 40 is shown that includes a working electrolyte 44 disposed between an anode 20 and a cathode 43. The anode 20 contains a dielectric film 21 and is embedded with a lead 42 (e.g., tantalum wire). The cathode 43 is formed from a micro-roughened cathode substrate 41, such as described above, and an electrochemically-active material 49. Although not shown, a separator may be positioned between the cathode 43 and anode 20 to prevent direct contact between the anode and cathode, yet permit ionic current flow of working electrolyte 44 to the electrodes. Any material employed as a separator in known electrolytic-type may be used as a separator in the present invention. Examples include paper, plastic fibers, glass fibers, papers made of these fibers, porous membranes, and ion-permeable materials (e.g., Nafion™). Typically, the anode and cathode are separated by a distance of from about 10 micrometers to about 1000 micrometers. In this embodiment, the micro-roughened cathode substrate 41 is in the form of a cylindrically-shaped "can" with an attached lid. A seal 23 (e.g., glass-to-metal) may also be employed that connects and seals the anode 20 to the cathode 43. Although not shown, the capacitor 40 may also include a spacer (not shown) that holds the anode 20 steady within the cathode 43. The spacer may, for example, be made of plastic and may be washer-shaped.

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 800 Volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device. For example, the equivalent series resistance ("ESR")—the extent that the capacitor acts like a resistor when charging and discharging in an electronic circuit—may be less than about 1500 milliohms, in some embodiments less than about 1000 milliohms, and in some embodiments, less than about 500 milliohms, measured with a 2-volt bias and 1-volt signal at a frequency of 1000 Hz.

The present invention may be better understood by reference to the following examples.

EXAMPLE 1

The ability to form a tantalum electrode in accordance with the present invention was demonstrated. Initially, a tantalum foil (surface area of 1 square centimeter) was initially spot welded to a tantalum wire and degreased in an aqueous solution of an Alconox detergent (10 wt. % in deionized water) for 30 minutes in an ultrasonication bath. The tantalum foil was then rinsed with deionized water and dried at ambient temperature. Thereafter, the tantalum wire was spot welded to a stainless steel bar for holding the tantalum foil through an alligator clip. The tantalum foil was placed in an electrolyte solution containing 60 milliliters of 1M $H_3PO_4$ and 40 milliliters 1M $H_2SO_4$ in a 100-milliliter beaker. An electrochemical cell was created using the tantalum foil prepared above as the anode and a piece of platinum wire as the cathode. The connection to the cathode was attached to the stainless steel bar that was spot welded to the tantalum wire so that the distance between the platinum wire and tantalum foil was 1 centimeter. The wire connection to the anode was attached to the platinum wire. Spark anodization of the tantalum foil was initiated by passing a DC current through the electrochemical cell at a density of 0.05 A/cm². After 10 minutes, the samples were removed. The power supply settings were set to 400V and 0.05 A. At these settings, a voltage of approximately 190V was reached in about 60 seconds and remained relatively constant for the duration of spark anodization. The duration of the experiment was 10 minutes during which the temperature was increased from 25° C. to 50° C. in the vicinity of the tantalum foil.

EXAMPLE 2

A tantalum electrode was formed as described in Example 1, except that the electrolyte solution contained 50 milliliters 1M $H_3PO_4$ and 50 milliliters 1M $H_2SO_4$, and the distance between the platinum wire and tantalum foil was 0.5 centimeter. The duration of the experiment was 10 minutes during which the temperature was increased from 29° C. to 50° C. in the vicinity of the tantalum foil. SEM photographs of the resulting electrode are shown in FIGS. 2-5. The area of one elevated region was estimated using FIG. 4. More specifically, the area was calculated using the following equation for cylinders: Area=$\pi r^2 + 2\pi rh$, where r (base radius) was estimated as 2 micrometers and h (height) was estimated as 1.3 micrometers. From the above, it was determined that the elevated region had an approximate area of 28.9 µm².

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a cathode, the method comprising:
immersing a metal substrate in an anodizing solution, wherein the metal substrate comprises tantalum;
applying a current at a voltage of from about 90 to about 275 Volts to initiate spark anodization and form a micro-roughened surface on the substrate that has a plurality of elevated regions; and
coating the substrate with an electrochemically-active material, wherein the electrochemically-active material includes a conductive polymer.

2. The method of claim 1, wherein the anodizing solution comprises an ionic compound and a corrosive compound.

3. The method of claim 2, wherein the ionic compound includes phosphoric acid and the corrosive compound includes sulfuric acid.

4. The method of claim 3, wherein sulfuric acid is present in the solution in an amount of from about 4 wt. % to about 6 wt % and phosphoric acid in the solution in an amount of from about 3 wt. % to about 5 wt. %.

5. The method of claim 1, wherein the voltage is from about 115 to about 220 Volts.

6. The method of claim 1, wherein the temperature of the anodizing solution is from about 20° C. to about 55° C.

7. The method of claim 1, wherein at least a portion of the elevated regions have a height of from about 200 to about 2500 nanometers.

8. The method of claim 1, wherein the micro-roughened surface contains from 1 to 20 elevated regions per 100 square micrometers.

9. The method of claim 1, wherein the electrochemically-active material includes metal particles, metal oxide particles, or a combination thereof.

10. The method of claim 1, wherein the metal substrate is a foil.

11. The method of claim 1, wherein the substrate is electrically conductive.

12. The method of claim 1, wherein the cathode has a specific capacitance of from about 25 to about 100 milliFarads per square centimeter.

13. The method of claim 1, wherein the cathode has a thickness of about 100 micrometers or less.

14. A method for forming a wet capacitor, the method comprising:
disposing a working electrolyte between an anode and the cathode formed by the method of claim 1.

15. The method of claim 14, wherein the anode includes tantalum, niobium, or an electrically conductive oxide thereof.

16. The method of claim 14, wherein the anode is anodized and contains a dielectric film.

* * * * *